(12) United States Patent
Crouse (10) Patent No.: US 9,558,246 B1
(45) Date of Patent: Jan. 31, 2017

(54) SYSTEM AND METHOD FOR TIME-BASED CLUSTERING OF DATA-ACCESS INSTANCES

(71) Applicant: Dell Software Inc., Aliso Viejo, CA (US)

(72) Inventor: Steven Crouse, Halifax (CA)

(73) Assignee: Dell Software Inc., Aliso Viejo, CA (US)

( * ) Notice: Subject to any disclaimer, the term of this patent is extended or adjusted under 35 U.S.C. 154(b) by 296 days.

(21) Appl. No.: 14/264,889

(22) Filed: Apr. 29, 2014

(51) Int. Cl.
*G06F 17/30* (2006.01)
(52) U.S. Cl.
CPC ... *G06F 17/30551* (2013.01); *G06F 17/30705* (2013.01)
(58) Field of Classification Search
None
See application file for complete search history.

(56) References Cited

U.S. PATENT DOCUMENTS

2012/0054333 A1   3/2012   Vichare et al.

FOREIGN PATENT DOCUMENTS

WO   WO-2012123844 A1   9/2012

OTHER PUBLICATIONS

Pentakalos et al. Automated Clustering-Based Workload Characterization. 1996. <http://storageconference.us/1996/papers/a6_16.pdf>.*
K-Means Clustering. A Tutorial on Clustering Algorithms. Mar. 30, 2013. <https://web.archiye.org/web/20130330112735/http://home.deib.polimi.it/matteucc/Clustering/tutorial_html/kmeans.html>.*
Xie, Yunjuan, et al., "Web User Clustering from Access Log Using Belief Function," K-CAP '01, Oct. 22-23, 2001, pp. 202-208.
Wikipedia, "Category: Data Clustering Algorithms," http://en.wikipedia.org, last modified on Apr. 3, 2013, 2 pages.
Dixit, Dipa, et al., "Automatic Recommendation for Online Users Using Web Usage Mining," International Journal of Managing Information Technology (IJMIT), vol. 2, No. 3, Aug. 2010, 10 pages.
Heer, Jeffrey, et al., "Mining the Structure of User Activity using Cluster Stability," SIAM Conference on Data Mining (Arlington, VA), 2002, 10 pages.
Jin, Xin, et al., "GAD: General Activity Detection for Fast Clustering on Large Data," SIAM International Conference on Data Mining (Sparks, NV), Apr. 30, 2009, 12 pages.

* cited by examiner

*Primary Examiner* — Syed Hasan
(74) *Attorney, Agent, or Firm* — Winstead PC (57) ABSTRACT

In one embodiment, a method includes accessing a data-access history for a time period, the data-access history comprising a plurality of data-access instances. The method further includes initially associating each data-access instance with a time-based data-access cluster of a plurality of time-based data-access clusters based, at least in part, on a time of the data-access instance. In addition, the method includes iteratively refining a time distribution of the plurality of data-access instances across the plurality of time-based data-access clusters. Further, the method includes facilitating a time-density analysis of the plurality of data-access instances using the iteratively refined plurality of time-based data-access clusters.

17 Claims, 5 Drawing Sheets

```
Retrieving activity data and processing results...

Found 11904 activity data points
Found 19 unique clusters of activity.

Filtering outlier clusters...
        Removing clusters with less than 0 records Cluster centroids:
    Activities:    5195    Time Span:  10/2/2013 4:34:40 PM - 10/2/2013 4:51:02 PM
    Activities:     811    Time Span:  10/2/2013 4:52:05 PM - 10/2/2013 5:09:51 PM
    Activities:     314    Time Span:  10/2/2013 5:10:54 PM - 10/2/2013 5:25:13 PM
    Activities:     352    Time Span:  10/2/2013 5:26:15 PM - 10/2/2013 5:34:25 PM
    Activities:     102    Time Span:  10/2/2013 5:35:26 PM - 10/2/2013 5:39:30 PM
    Activities:      66    Time Span:  10/2/2013 5:40:32 PM - 10/2/2013 5:42:38 PM
    Activities:      18    Time Span:  10/2/2013 5:43:41 PM - 10/2/2013 5:43:41 PM
    Activities:      20    Time Span:  10/2/2013 5:44:43 PM - 10/2/2013 5:44:43 PM
    Activities:      22    Time Span:  10/2/2013 5:45:44 PM - 10/2/2013 5:45:44 PM
    Activities:      18    Time Span:  10/2/2013 5:46:45 PM - 10/2/2013 5:46:45 PM
    Activities:      22    Time Span:  10/2/2013 5:47:48 PM - 10/2/2013 5:47:48 PM
    Activities:      43    Time Span:  10/2/2013 5:48:52 PM - 10/2/2013 5:49:52 PM
    Activities:     416    Time Span:  10/2/2013 5:50:58 PM - 10/2/2013 5:58:10 PM
    Activities:     478    Time Span:  10/2/2013 5:59:12 PM - 10/2/2013 6:12:39 PM
    Activities:     356    Time Span:  10/2/2013 6:13:40 PM - 10/2/2013 6:31:03 PM
    Activities:    1017    Time Span:  10/2/2013 6:32:04 PM - 10/2/2013 6:56:33 PM
    Activities:     641    Time Span:  10/2/2013 6:57:36 PM - 10/2/2013 7:29:16 PM
    Activities:     990    Time Span:  10/2/2013 7:30:19 PM - 10/2/2013 8:03:04 PM
    Activities:    1023    Time Span:  10/2/2013 8:04:06 PM - 10/2/2013 8:28:36 PM Smallest Cluster:
        Number of items: 18
        Time: 10/2/2013 5:43:41 PM Largest Cluster:
        Number of items: 5195
        Time: 10/2/2013 4:40:48 PM
```

```
Retrieving activity data and processing results...

Found 17680 activity data points
Found 4 unique clusters of activity.

Filtering outlier clusters...
        Removing clusters with less than 0 records Cluster centroids:
  Activities:   6795    Time Span:  10/2/2013 4:34:40 PM  -  10/2/2013 5:40:32 PM
  Activities:   3259    Time Span:  10/2/2013 5:41:37 PM  -  10/2/2013 7:36:26 PM
  Activities:   4401    Time Span:  10/2/2013 7:37:27 PM  -  10/2/2013 9:45:22 PM
  Activities:   3231    Time Span:  10/2/2013 9:46:23 PM  -  10/3/2013 12:02:20 AM Smallest Cluster:
        Number of items: 3231
        Time: 10/2/2013 10:51:56 PM Largest Cluster:
        Number of items: 6795
        Time: 10/2/2013 4:48:59 PM
```

FIG. 5

SYSTEM AND METHOD FOR TIME-BASED CLUSTERING OF DATA-ACCESS INSTANCES

BACKGROUND

Technical Field

The present disclosure relates generally to activity monitoring and more particularly, but not by way of limitation, to activity clustering systems and methods.

History of Related Art

Many mechanisms exist for tracking and keeping records of user activity on file systems, but such mechanisms typically generate a massive amount of data that provides very little value on its own. In general, the scope of the data is too vast to glean any useful information without further processing.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed by a computer system comprising computer hardware. The method includes accessing a data-access history for a time period, the data-access history comprising a plurality of data-access instances. The method further includes initially associating each data-access instance with a time-based data-access cluster of a plurality of time-based data-access clusters based, at least in part, on a time of the data-access instance. In addition, the method includes iteratively refining a time distribution of the plurality of data-access instances across the plurality of time-based data-access clusters. Further, the method includes facilitating a time-density analysis of the plurality of data-access instances using the iteratively refined plurality of time-based data-access clusters.

In one embodiment, an information handling system includes a processing unit, wherein the processing unit is operable to implement a method. The method includes accessing a data-access history for a time period, the data-access history comprising a plurality of data-access instances. The method further includes initially associating each data-access instance with a time-based data-access cluster of a plurality of time-based data-access clusters based, at least in part, on a time of the data-access instance. In addition, the method includes iteratively refining a time distribution of the plurality of data-access instances across the plurality of time-based data-access clusters. Further, the method includes facilitating a time-density analysis of the plurality of data-access instances using the iteratively refined plurality of time-based data-access clusters.

In one embodiment, a computer-program product includes a non-transitory computer-usable medium having computer-readable program code embodied therein. The computer-readable program code is adapted to be executed to implement a method. The method includes accessing a data-access history for a time period, the data-access history comprising a plurality of data-access instances. The method further includes initially associating each data-access instance with a time-based data-access cluster of a plurality of time-based data-access clusters based, at least in part, on a time of the data-access instance. In addition, the method includes iteratively refining a time distribution of the plurality of data-access instances across the plurality of time-based data-access clusters. Further, the method includes facilitating a time-density analysis of the plurality of data-access instances using the iteratively refined plurality of time-based data-access clusters.

BRIEF DESCRIPTION OF THE DRAWINGS

A more complete understanding of the method and apparatus of the present disclosure may be obtained by reference to the following Detailed Description when taken in conjunction with the accompanying Drawings wherein:

FIG. 4 illustrates an example of a report.

DETAILED DESCRIPTION OF ILLUSTRATIVE EMBODIMENTS

In various embodiments, data-access activity can be better analyzed in a clustered manner utilizing systems and methods described herein. Particular data may be subject to organization in a file system (e.g. as a file, directory or folder, etc.), a database system (e.g., as a database, a record, etc.), and/or the like. Each access of certain data (e.g., a file, directory or folder, database, record, and/or other object or unit of data) may be referred to herein as a data-access instance. In general, each data-access instance is associated with a time at which the data access occurred or is deemed to have occurred. The time may be, for example, a point in time to a nearest hour, minute, second, millisecond, etc.

Regardless of a type or format of the data, in various embodiments, data-access instances can be analyzed in an exploratory fashion to discover noteworthy time-based clusters of user data-access activity. For illustrative purposes, certain examples will be described herein relative to analyzing file-system activity. It should be appreciated, however, that it is expressly contemplated that various principles described herein are equally applicable to data-access activity unrelated to a file system. For instance, data-access instances can relate to a database system or any other system that is operable to store and/or provide access to data.

In the context of computer operating systems, a file may be defined as a named collection of data. Files are normally retained in storage devices. A file system is that portion of an operating system whose primary task is to manage the files retained on one or more storage devices. In general, the file system is the means through which all files are manipulated (e.g., created, destroyed and modified). To aid in this task, file systems retain and/or obtain information about each file, so called "metadata." Illustrative file metadata include the file's user-specified name, a file identifier (for uniquely identifying the file to the file system), a pointer or reference to the file in non-volatile storage (or main memory), the user ID associated with the file's creation, the time at which the file was created, the user ID associated with the last modification to the file, the time the last modification to the file was made and security information. Illustrative security information includes which specified users or user groups (e.g., administrator, employees and executives) are permitted to read or modify the file. It will be recognized that some, or all, of this metadata may be retained within the file itself. For purposes of this patent application, a file-system object can encompass a file, group of files, a directory, a folder, and/or the like.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
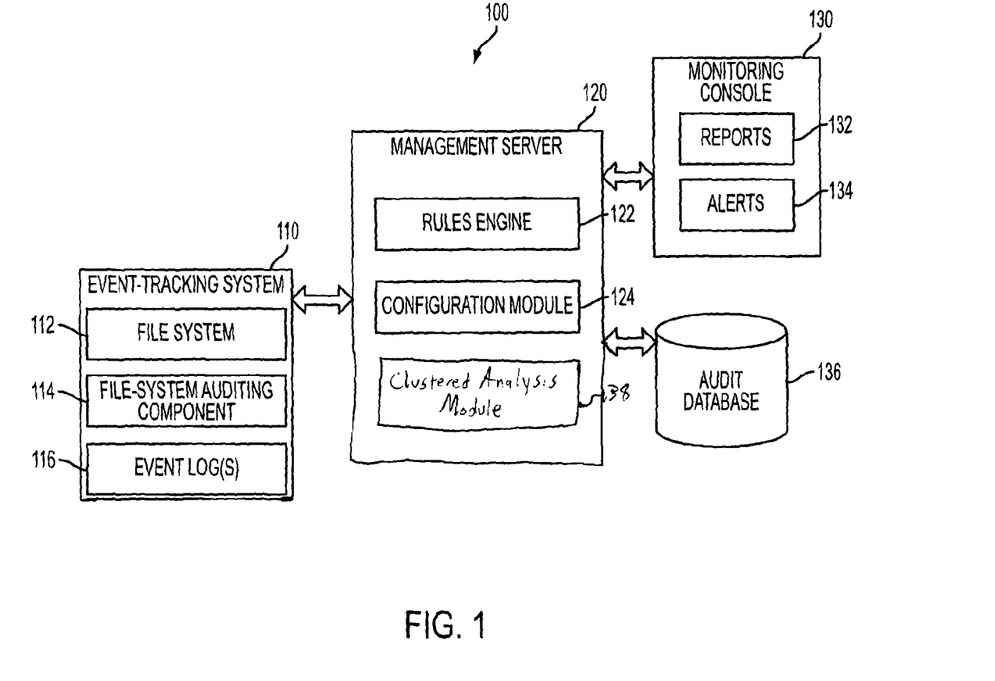
FIG. 1 illustrates an example of a system for monitoring a file-system environment.

FIG. 1 illustrates an example of a system 100 for monitoring a file-system environment. In general, the system 100 is configured to provide for real-time security auditing and/or reporting on activity in the file-system environment. For example, the file-system environment can comprise a Microsoft Windows® environment, a Linux environment, a UNIX environment, and/or the like.

As shown in FIG. 1, the system 100 can include a file-event tracking system 110 that is in communication with a management server 120. The management server 120 is further in communication with a monitoring console 130. In general, the management server 120 coordinates real-time monitoring and/or reporting of activity on the file-event tracking system 110. As discussed in more detail below, the monitoring console 130 provides for user interaction with the management server 120. In certain embodiments, the file-event tracking system 110 can include a single information handling system (e.g., a single computer or server) or can be distributed among multiple information handling systems (e.g., multiple servers coupled through a network).

The file-event tracking system 110 can further include a file system 112 and a file-system auditing component 114. The file-system auditing component 114 is shown to reside on the file-event tracking system 110. In certain embodiments, the file-system auditing component 114 can include hardware/software modules and/or subcomponents for real-time monitoring or auditing of the file system 112. For example, the file-system auditing component 114 can be configured to monitor user file-system activity. Types of file-system activity that may be specified by a user include directory and file operations such as create, delete, move, rename, security change (e.g. a change to permissions), access denied while creating, access denied while opening actions, etc.

In certain embodiments, an administrator or other user may specify that one or more of these file system actions be tracked on a per-file, per-directory, per-user group, per-process, and/or per-user identification basis. In addition, all of one or more specified file-system activities may also be tracked (regardless of file, directory, group, process or user identification). File-system activities that are tracked may be considered file-system events. In various embodiments, file-system-event specification can be obtained from a user (e.g., a system administrator) though a graphical user interface ("GUI"). In certain embodiments, the data obtained by the file-system auditing component 114 can be used as audit data and/or to identify potential security breaches or threats in the file-event tracking system 110.

It will be appreciated that, in other embodiments, the file-system auditing component 114 can at least partially reside on a remote system such as the management server 120. For instance, the file-system auditing component 114 can be in the form of various modules. As can be appreciated by one of ordinary skill in the art, each of the modules can comprise various sub-routines, procedures, definitional statements, and/or macros. Moreover, individual modules can be compiled and linked into an executable program, installed in a dynamic link library, or may be written in an interpretive language. It will be appreciated that software modules can be callable from other modules or from themselves, and/or may be invoked in response to detected events or interrupts.

In certain embodiments, the file-system auditing component 114 is further configured to generate one or more event logs 116 that include information captured, detected or otherwise generated in real time by the file-event tracking system 110. For instance, the event log(s) 116 can include information on file-system events as described above. Although the event log(s) 116 are shown as being stored on the file-event tracking system 110, it will also be understood that the event log(s) 116 can be stored with the file-system auditing component 114 or remote to the file-event tracking system 110. In certain embodiments, the event log(s) are encrypted, write-protected or otherwise maintained to prevent modification of information therein by users, administrators or other personnel with privileged or super access rights.

The file-system auditing component 114, in certain implementations, outputs data obtained from or concerning the file system 112 to the management server 120 for storage and/or analysis. For instance, data from the event log(s) 116 may be evaluated and/or sent to the management server 120. In certain embodiments, the file-system auditing component 114 encrypts this data prior to transmission to the management server 120. The data can be stored, for instance, in an audit database 136, such as a SQL server.

The management server 120 is shown to include a rules engine 122, a configuration module 124, and a clustered analysis module 138. In certain embodiments, the clustered analysis module 138 is operable to group data-access instances such as, for example, file-system events, into time-based clusters based, at least in part, on a time associated with the data-access instances. In various embodiments, the clustered analysis module 138 can be initiated by the rules engine 122, triggered manually by a user or administrator, and/or the like. In addition, the clustered analysis module 138 can be initiated or triggered with respect to certain users or groups of users, certain files or groups files, and/or the like. Examples will be described in greater detail with respect to FIGS. 2-3.

For illustrative purposes, the clustered-analysis module 138 is shown to be resident on the management server 120. However, it should be appreciated that, in various other embodiments, the clustered-analysis module 138 can reside on the event-tracking system 110 or on another network node in communication with the system 100. In addition, in some embodiments, the clustered-analysis module 138 can be a sub-module of the file-system auditing component 114.

In certain embodiments, the rules engine 122 is configured to analyze the data either as it is received (e.g., streamed) directly from the file-system auditing component 114 or after retrieving the data from the audit database 136. In certain embodiments, the rules engine 122 includes user-defined business rules, policies, metrics, sites, data sources, configuration objects, real-time monitoring rules, combinations of the same, and/or the like. In an example, the rules engine 122 can be used to determine when to initiate the clustered analysis module 138. For instance, the rules engine 122 can determine whether the clustered analysis module 138 should be triggered upon certain file-system events, at certain time intervals (e.g., daily, weekly, etc.), at a scheduled point in time, etc.

In another example, the rules engine 122 can be used to determine when a report and/or alert needs to be sent to the monitoring console 130 based on information gathered by the file-system auditing component 114 and/or the clustered analysis module 138. For example, the rules engine 122 can determine whether, given a result reached by the clustered analysis module 138, one or more alerts should be sent. The rules engine 122 can further specify to whom the one or more alerts should be sent and how the one or more alerts should be delivered.

In certain embodiments, the configuration module 124 receives user input regarding settings for the monitoring and/or auditing of the file system 112. In certain embodiments, the configuration module 124 communicates with a computer operated by information technology (IT) personnel, an administrator, a security officer, a compliance officer or auditor, or the like.

In an example, a user can use the configuration module 124 to specify rules for initiating the clustered analysis module 138. Such rules can be maintained by the rules engine 122 as described above. A user can also specify a data-instance scope for any clustered analysis that the clustered analysis module 138 performs. For example, the user can specify, for a given trigger, a user or group of users, a data set, a period of time, and/or the like. The data set can be, for example, a file-system object such as a particular file, a higher-level file-system object such as a folder or directory, a selection of files, etc. The user or group of users, the data set, and the period of time can serve to restrict the data-access instances that are subject to the clustered analysis by the clustered analysis module 138.

In another example, the configuration module 124 can interact with a user interface to manage reporting tasks and/or real-time alerting by the management server 120. In certain embodiments, reporting tasks can include storing audit data in repositories, importing necessary data to audit databases and/or building reports based on the data. Real-time alerting can include, for instance, creating alerts when particular events are detected and/or when certain clusters of data-access instances are identified by the clustered analysis module 138. For instance, in various embodiments, the configuration module 124 can allow a user or administrator to configure a data-access time density at which alerts should be generated (e.g., a certain number of data-access instances by a certain user or group of users, with respect to a certain file or group of files, within a certain period of time). Real-time alerting can also include, for example, storing the alerts in a database and/or immediately issuing notifications. In certain embodiments, the configuration module 124 can be further adapted for obtaining and/or analyzing data stored in the audit database 136, modifying or adding to the rules in the rules engine 122 in other ways than described above, combinations of the same, and/or the like.

In certain embodiments, the configuration module 124 can be configured to communicate with the monitoring console 130 to obtain user input regarding the auditing of file system data. In certain embodiments, a user may use the configuration module 124 to specify that one or more file system events be tracked on a per-file, per-directory, per-user group, per-process, and/or per-user identification basis. In addition, all of one or more specified event types may also be tracked (regardless of file, directory, group, process or user identification).

The monitoring console 130 advantageously provides an interface for communicating to a user one or more results of the monitoring process. In certain embodiments, the monitoring console 130 comprises a web-based application for working with real-time monitoring alerts. For instance, the application may track the progress of alert resolution and/or include tools for customizing the user interface display.

As illustrated in FIG. 1, the monitoring console 130 further comprises reports 132 and alerts 134. In certain embodiments, the alerts 134 comprise real-time notification of events of interest, such as for example, via email, a text message, a pop-up window, instant message, combinations of the same or the like. The reports 132, in certain embodiments, comprise an analysis tool, such as a log or list of the events of interest, that may be later accessed and evaluated. Moreover, in certain embodiments, the monitoring console 130 can be configured to maintain user profiles such that users can view only the alerts and/or reports they need and/or have permission to access.

Figure 2:
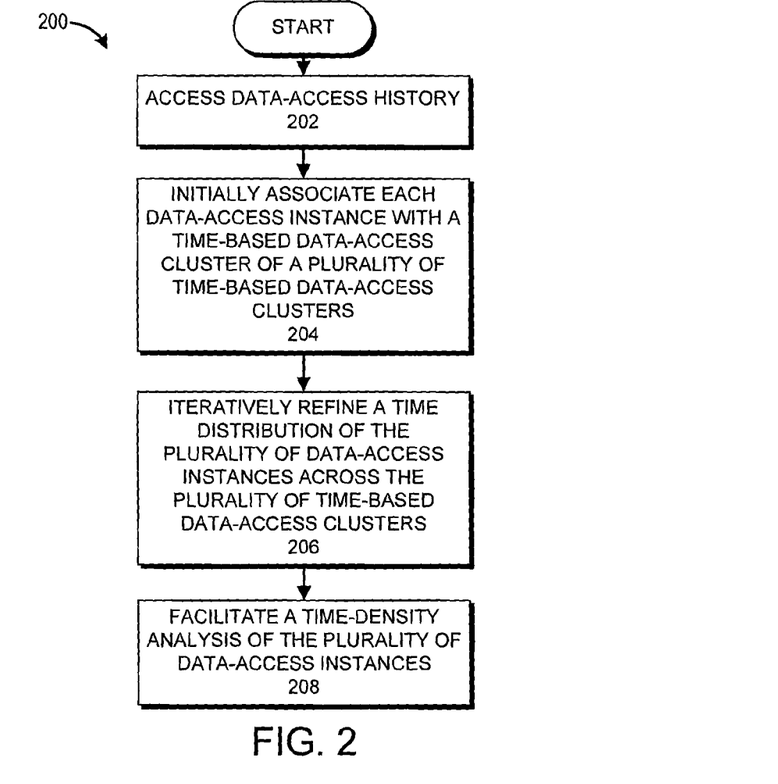
FIG. 2 illustrates an example of a process for performing a clustered analysis of data-access instances.

FIG. 2 illustrates an example of a process 200 for performing a clustered analysis of data-access instances. For example, the process 200, in whole or in part, can be implemented by one or more of the file system 112, the file-system auditing component 114, the clustered analysis module 138, the rules engine 122, the configuration module 124, and/or the monitoring console 130. The process 200 can also be performed generally by the file-event tracking system 110, the management server 120, and/or the system 100. Although any number of systems, in whole or in part, can implement the process 200, to simplify discussion, the process 200 will be described in relation to specific systems or subsystems of the system 100.

In various embodiment, the process 200 can be triggered manually by an administrator or other user, automatically by the rules engine 122, and/or in another suitable manner. In addition, in various embodiments, the process 200 can be performed for a particular data-instance scope. The data-instance scope can include, for example, a user or group of users, a data set such as a file or group of files, a period of time, etc. The data-instance scope can be specified by the administrator or other user, by the rules engine 122, etc.

At block 202, the clustered analysis module 138 accesses a data-access history for a time period. In a typical embodiment, the data-access history includes a plurality of data-access instances that meet, for example, the data-instance scope. In some cases, the data-access history can be retrieved from the event log(s) 116 of FIG. 1.

At block 204, the clustered analysis module 138 initially associates each data-access instance of the data-access history with one of a plurality of time-based data-access clusters. In certain embodiments, the block 204 can involve placing each data-access instance in one of the plurality of time-based data-access clusters based, at least in part, on a time of the data-access instance. In some cases, a quantity of the plurality of time-based data-access clusters can be specified by the administrator or other user, by the rules engine 122, etc., at a time that the process 200 is triggered. In other cases, the quantity can be pre-configured, hardcoded, and/or the like. In a typical embodiment, each time-based data-access cluster logically encapsulates data-access instances deemed related in terms of time. An example of functionality that can be performed at the block 204 will be described in greater detail with respect to FIG. 3.

At block 206, the clustered analysis module 138 iteratively refines a time distribution of the plurality of data-access instances across the plurality of time-based data-access clusters. In general, an objective of the block 206 is to better define the plurality of time-based data access clusters so that a time density of each cluster can be increased. Stated somewhat differently, the block 206 can serve to minimize a time distance between data-access instances of a given time-based data-access cluster. As the plurality of time-based data-access clusters are redefined, the data-access instances can be relocated to another time-based data-access cluster as appropriate. In some embodiments, the block 206 can include repeatedly re-grouping the plurality of data-access instances until stop criteria is met (e.g., a number of iterations, only one relocation occurs, etc.). An example of functionality that can be performed at the block 206 will be described in greater detail with respect to FIG. 3.

At block 208, the clustered analysis module 138 facilitates a time-density analysis of the plurality of data-access instances using the iteratively refined plurality of time-based data-access instances. In various embodiments, the facilitation can include presentation of a report to an administrator or other user. In some cases, the clustered analysis module 138 may identify one or more time-based data-access clusters having a highest time density, a lowest time density, etc. In these cases, whatever time-based data-access clusters are identified can be included in a report that is presented to an administrator or other user.

Figure 3:
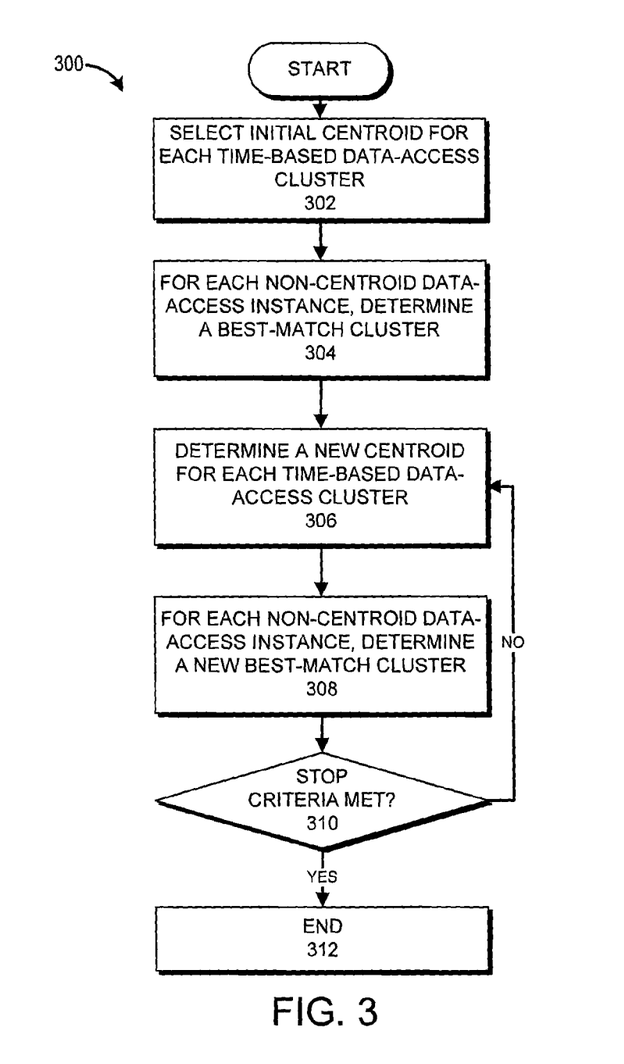
FIG. 3 illustrates an example of a process for grouping data-access instances into clusters.

FIG. 3 illustrates an example of a process 300 for grouping data-access instances into clusters. For example, the process 300, in whole or in part, can be implemented by one or more of the file system 112, the file-system auditing component 114, the clustered analysis module 138, the rules engine 122, the configuration module 124, and/or the monitoring console 130. The process 300 can also be performed generally by the file-event tracking system 110, the management server 120, and/or the system 100. Although any number of systems, in whole or in part, can implement the process 300, to simplify discussion, the process 300 will be described in relation to specific systems or subsystems of the system 100. In certain embodiments, blocks 302-304 can be performed as all or part of block 204 of FIG. 1 while blocks 306-312 can be performed as all or part of block 206 of FIG. 2.

At block 302, the clustered analysis module 138 selects a centroid for each time-based data-access cluster of a plurality of time-based data-access clusters. In certain embodiments, the block 302 can include, for each time-based data-access cluster, randomly selecting a different data-access instance to serve as a centroid for that data-access cluster. In a typical embodiment, the block 302 represents an initial centroid selection that can be iteratively refined as described below.

At block 304, for each non-centroid data-access instance of the plurality of data-access instances, the clustered analysis module 138 determines a best-match cluster from among the plurality of time-based data-access clusters. For each data-access instance, the best-match cluster can be considered the cluster with which the data-access instance is associated (e.g., the cluster in which the data-access instance is placed).

In an example, for a given data-access instance, the best-match cluster can be the cluster whose centroid is closest to the given data-access instance in terms of time distance. For instance, time distance can be computed as defined by Equation 1 below. In particular, Equation 1 illustrates computation of a time distance D between a time A associated with a first data-access instance and a time B associated with a second data-access instance, one of which corresponds to the centroid. In certain embodiments, the time A and the time B can be specified as a number of milliseconds elapsed since Jan. 1, 1970 (i.e., UNIX time).

$$D=\sqrt{(A-B)^2} \qquad \text{Equation 1}$$

At block 306, the clustered analysis module 138 determines a new centroid for each of the plurality of time-based data-access clusters. For example, in some embodiments, the new centroid can be selected from among data-access instances associated with each time-based data-access cluster. It should be appreciated that, in many cases, the new centroid for a particular time-based data-access cluster may be the same centroid determined in the previous iteration of the block 306. In some embodiments, for a given time-based data-access cluster, the centroid can be the data-access instance having the median time value among all data-access instances in the cluster.

At block 308, the clustered analysis module 138 determines a new best-match cluster for each data-access instance. In general, the block 308 can include performing the functionality described above with respect to block 304. At decision block 310, the clustered analysis module 138 determines whether stop criteria has been met. In a typical embodiment, the stop criteria includes one or more configurable conditions.

In an example, the stop criteria can specify a maximum number of iterations of blocks 304-306 (e.g., 25 iterations). According to this example, the stop criteria would be met after the clustered analysis module iterates through blocks 304-306 the maximum number of times. In another example, the stop criteria can specify a minimum number of data-access-instance relocations. According to this example, if the last iteration through blocks 304-306 failed to result in at least the minimum number of data-access-instance relocations, the stop criteria would be met. The stop criteria can also specify other conditions that will be apparent to one skilled in the art after reviewing the present disclosure.

If it is determined at the decision block 310 that the stop criteria has not bet met, the process 300 returns to block 306 for determination of new centroids as described above. Otherwise, if it is determined at the decision block 310 that the stop criteria has been met, the process 300 proceeds to block 312 and ends.

FIG. 4 illustrates an example of a report 400 that can result, for example, from processes such as the process 200 of FIG. 2 and the process 300 of FIG. 3. The report 400 illustrates an example in which nineteen time-based data-access clusters are utilized. According to this example, a period of heavy data-access activity can be identified for the period spanning from 4:34 PM to 4:51 PM. Conversely, a period of very little data-access activity can be identified from the period spanning from approximately 5:40 PM to 6:32 PM.

Figure 5:
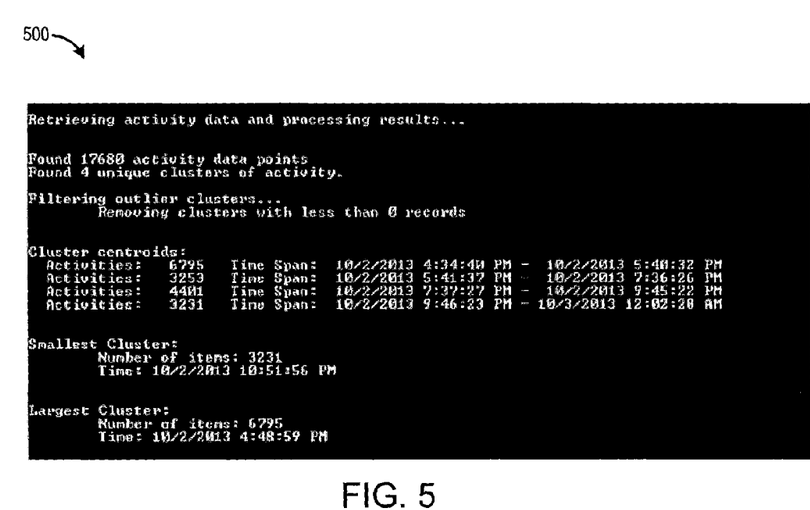
FIG. 5 illustrates an example of a report.

FIG. 5 illustrates an example of a report 500 that can result, for example, from processes such as the process 200 of FIG. 2 and the process 300 of FIG. 3. In particular, the report 500 illustrates a result of re-executing processes such as the process 200 and the process 300 using the same data-access instances of FIG. 4 but with only five time-based data-access clusters. According to this example, a high concentration of activity (i.e., high time density) can be identified in the period spanning from approximately 4:34 PM to 5:40 PM. According to this example, one of the five time-based data-access clusters is filtered from the report 500 as an outlier.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, by a computer system comprising computer hardware:
    accessing a data-access history of a user for a time period, the data-access history comprising a plurality of data-access instances of the user during the time period;
    initially associating each data-access instance with a time-based data-access cluster of a plurality of time-based data-access clusters based, at least in part, on a time of the data-access instance;
    iteratively refining a time distribution of the plurality of data-access instances across the plurality of time-based data-access clusters;
    identifying a particular time-based data-access cluster of the iteratively refined plurality of time-based data-access clusters as having a high time density in relation to others of the iteratively refined plurality of time-based data-access clusters; and
    reporting the particular time-based data-access cluster in relation to the user.

2. The method of claim 1, wherein the initially associating comprises:
    selecting a centroid for each time-based data-access cluster, wherein each centroid corresponds to at least one of the plurality of data-access instances;
    for each non-centroid data-access instance of the plurality of data-access instances, determining a best-match cluster of the plurality of time-based data-access clusters; and
    wherein, for each non-centroid data-access instance, the determining of the best-match cluster is based, at least in part, on a time distance between the non-centroid data-access instance and the centroid of each of the plurality of time-based data-access clusters.

3. The method of claim 2, wherein the selecting comprises randomly selecting a centroid for each time-based data-access cluster.

4. The method of claim 2, wherein the iteratively refining comprises repeatedly grouping the plurality of data-access instances by time until stop criteria is met.

5. The method of claim 4, wherein the grouping comprises:
    determining a centroid for each time-based data-access cluster, wherein each centroid corresponds to at least one of the plurality of data-access instances;
    for each non-centroid data-access instance of the plurality of data-access instances, determining a best-match cluster of the plurality of time-based data-access clusters; and
    wherein, for each non-centroid data-access instance, the determining of the best-match cluster is based, at least in part, on a time distance between the non-centroid data-access instance and the centroid of each of the plurality of time-based data-access clusters.

6. The method of claim 5, wherein, for each time-based data-access cluster, the determining of the centroid comprises determining a median value of data-access instances associated with the time-based data-access cluster.

7. The method of claim 4, wherein the stop criteria comprises at least one of:
    a number of iterations of the grouping; and
    a number of data-access-instance movements resulting from a most-recent iteration of the grouping.

8. The method of claim 1, wherein the plurality of data-access instances relate to file accesses on a file system.

9. An information handling system comprising:
    a processing unit, wherein the processing unit is operable to implement a method, the method comprising:
        accessing a data-access history of a user for a time period, the data-access history comprising a plurality of data-access instances of the user during the time period;
        initially associating each data-access instance with a time-based data-access cluster of a plurality of time-based data-access clusters based, at least in part, on a time of the data-access instance;
        iteratively refining a time distribution of the plurality of data-access instances across the plurality of time-based data-access clusters;
        identifying a particular time-based data-access cluster of the iteratively refined plurality of time-based data-access clusters as having a high time density in relation to others of the iteratively refined plurality of time-based data-access clusters; and
        reporting the particular time-based data-access cluster in relation to the user.

10. The information handling system of claim 9, wherein the initially associating comprises:
    selecting a centroid for each time-based data-access cluster, wherein each centroid corresponds to at least one of the plurality of data-access instances;
    for each non-centroid data-access instance of the plurality of data-access instances, determining a best-match cluster of the plurality of time-based data-access clusters; and wherein, for each non-centroid data-access instance, the determining of the best-match cluster is based, at least in part, on a time distance between the non-centroid data-access instance and the centroid of each of the plurality of time-based data-access clusters.

11. The information handling system of claim 10, wherein the selecting comprises randomly selecting a centroid for each time-based data-access cluster.

12. The information handling system of claim 10, wherein the iteratively refining comprises repeatedly grouping the plurality of data-access instances by time until stop criteria is met.

13. The information handling system of claim 12, wherein the grouping comprises:
    determining a centroid for each time-based data-access cluster, wherein each centroid corresponds to at least one of the plurality of data-access instances;
    for each non-centroid data-access instance of the plurality of data-access instances, determining a best-match cluster of the plurality of time-based data-access clusters; and
    wherein, for each non-centroid data-access instance, the determining of the best-match cluster is based, at least in part, on a time distance between the non-centroid data-access instance and the centroid of each of the plurality of time-based data-access clusters.

14. The information handling system of claim 13, wherein, for each time-based data-access cluster, the determining of the centroid comprises determining a median value of data-access instances associated with the time-based data-access cluster.

15. The information handling system of claim 12, wherein the stop criteria comprises at least one of:
    a number of iterations of the grouping; and
    a number of data-access-instance movements resulting from a most-recent iteration of the grouping.

16. The information handling system of claim 9, wherein the plurality of data-access instances relate to file accesses on a file system.

17. A computer-program product comprising a non-transitory computer-usable medium having computer-readable program code embodied therein, the computer-readable program code adapted to be executed to implement a method comprising:
    accessing a data-access history of a user for a time period, the data-access history comprising a plurality of data-access instances of the user during the time period;
    initially associating each data-access instance with a time-based data-access cluster of a plurality of time-based data-access clusters based, at least in part, on a time of the data-access instance;
    iteratively refining a time distribution of the plurality of data-access instances across the plurality of time-based data-access clusters;
    identifying a particular time-based data-access cluster of the iteratively refined plurality of time-based data-access clusters as having a high time density in relation to others of the iteratively refined plurality of time-based data-access clusters; and
    reporting the particular time-based data-access cluster in relation to the user.

* * * * *